(12) United States Patent
Monica et al.

(10) Patent No.: US 11,394,712 B2
(45) Date of Patent: Jul. 19, 2022

(54) SECURE ACCOUNT ACCESS

(71) Applicant: Anchor Labs, Inc., San Francisco, CA (US)

(72) Inventors: Diogo Monica, San Francisco, CA (US); Nathan P. McCauley, San Francisco, CA (US); Riyaz D. Faizullabhoy, Los Altos, CA (US); Boaz Avital, San Francisco, CA (US)

(73) Assignee: Anchor Labs, Inc., San Francisco, CA (US)

( * ) Notice: Subject to any disclaimer, the term of this patent is extended or adjusted under 35 U.S.C. 154(b) by 443 days.

(21) Appl. No.: 16/290,484

(22) Filed: Mar. 1, 2019

(65) Prior Publication Data
US 2020/0236113 A1 Jul. 23, 2020

Related U.S. Application Data

(60) Provisional application No. 62/794,295, filed on Jan. 18, 2019.

(51) Int. Cl.
*H04L 29/06* (2006.01)
*H04L 9/40* (2022.01)
(Continued)

(52) U.S. Cl.
CPC ....... *H04L 63/102* (2013.01); *G06Q 20/3276* (2013.01); *G06Q 20/3829* (2013.01);
(Continued)

(58) Field of Classification Search
None
See application file for complete search history.

(56) References Cited

U.S. PATENT DOCUMENTS 8,256,664 B1 * 9/2012 Balfanz ............... H04W 12/06
235/375
8,904,506 B1 * 12/2014 Canavor ............... G06F 16/00
726/7
(Continued)

OTHER PUBLICATIONS

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.
(Continued)

*Primary Examiner* — Piotr Poltorak
(74) *Attorney, Agent, or Firm* — Bookoff McAndrews, PLLC

(57) ABSTRACT

A computing device receives, from a first client device, a request for a security token to authenticate a transaction session for a user account administered by a network resource, the first client device being associated with the user account. In response to the request, the computing device generates and sends a security token to the first client device, which communicates the security token to a second client device. The computing device receives, from the second client device, a modified security token that includes the security token and a signature on the security token using a first key stored in a trusted hardware component coupled to the second client device. A second key corresponding to the first key is registered with the network resource. The computing device verifies the modified security token using the second key. Upon successfully verifying the modified security token, the computing device enables the transaction session.

57 Claims, 8 Drawing Sheets

(51) Int. Cl.
   *H04L 9/32*   (2006.01)
   *H04L 9/14*   (2006.01)
   *G06Q 20/32*  (2012.01)
   *G06Q 20/38*  (2012.01)
   *G06T 11/60*  (2006.01)
   *G06K 7/14*   (2006.01)

(52) U.S. Cl.
   CPC ............... *G06T 11/60* (2013.01); *H04L 9/14* (2013.01); *H04L 9/3213* (2013.01); *H04L 63/0807* (2013.01); *H04L 63/0861* (2013.01); *G06K 7/1417* (2013.01); *G06Q 2220/00* (2013.01)

(56) References Cited

U.S. PATENT DOCUMENTS

| | | | |
|---|---|---|---|
| 9,916,581 B2 | 3/2018 | Dorsey et al. | |
| 10,045,093 B2* | 8/2018 | Thorwirth | H04N 21/23439 |
| 10,123,202 B1* | 11/2018 | Polehn | H04W 12/42 |
| 2002/0161591 A1* | 10/2002 | Danneels | G06Q 20/367 |
| | | | 705/65 |
| 2007/0039039 A1* | 2/2007 | Gilbert | H04L 63/0876 |
| | | | 726/4 |
| 2008/0307515 A1* | 12/2008 | Drokov | G06Q 20/32 |
| | | | 726/7 |
| 2011/0072501 A1* | 3/2011 | Fukui | H04L 63/101 |
| | | | 726/8 |
| 2011/0219427 A1* | 9/2011 | Hito | H04L 63/18 |
| | | | 726/3 |
| 2013/0007867 A1* | 1/2013 | Sowatskey | H04L 63/0815 |
| | | | 726/8 |
| 2013/0104215 A1* | 4/2013 | Cheng | H04L 61/103 |
| | | | 726/7 |
| 2014/0156534 A1 | 6/2014 | Quigley et al. | |
| 2014/0222981 A1* | 8/2014 | Durand | H04L 61/2084 |
| | | | 709/222 |
| 2014/0282961 A1 | 9/2014 | Dorfman et al. | |
| 2015/0170112 A1 | 6/2015 | DeCastro | |
| 2016/0283920 A1 | 9/2016 | Fisher et al. | |
| 2017/0154331 A1 | 6/2017 | Voorhees | |
| 2017/0171755 A1* | 6/2017 | Grange | H04B 1/3833 |
| 2017/0359338 A1* | 12/2017 | Tschofenig | G06F 21/34 |
| 2017/0373849 A1 | 12/2017 | Donner et al. | |
| 2018/0130158 A1 | 5/2018 | Atkinson et al. | |

OTHER PUBLICATIONS

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Wired.com [online], "Crypto anchors' might stop the next Equifax-style megabreach," Oct. 11, 2017, retrieved from: URLhttps://www.wired.com/story/crypto-anchors-breach-security/>, 11 pages.

PCT International Search Report and Written Opinion in International Appln. No. PCT/US2019/061705, dated Feb. 21, 2020, 14 pages.

* cited by examiner

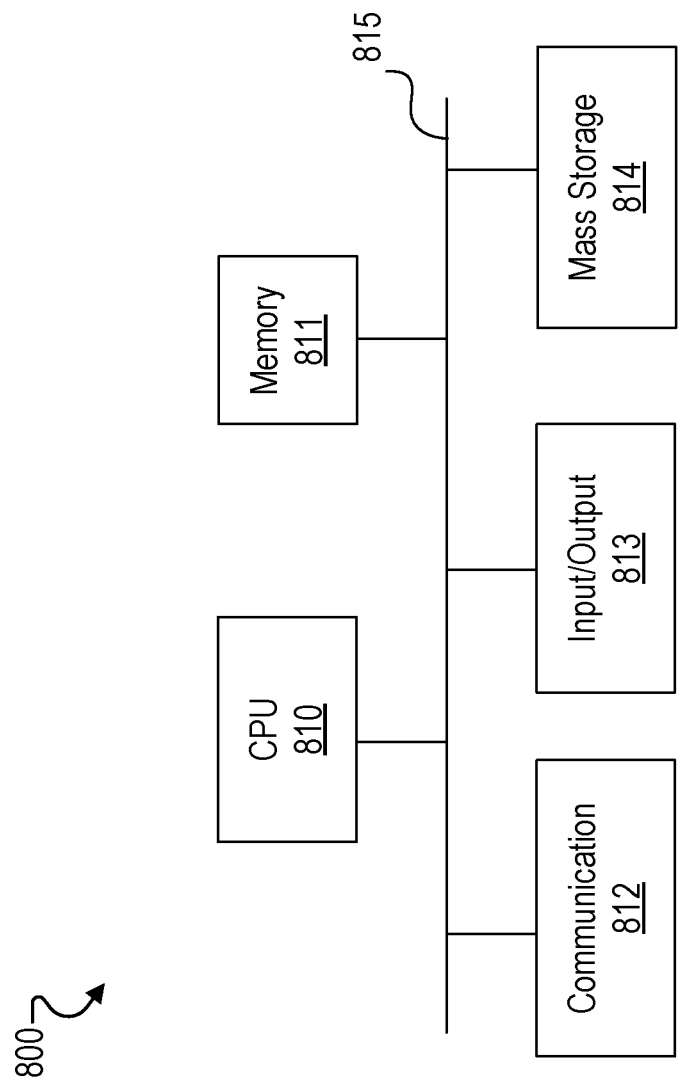

SECURE ACCOUNT ACCESS

CROSS-REFERENCE TO RELATED APPLICATIONS

This application claims the benefit under 35 U.S.C. § 119(e) of the filing date of U.S. Patent Application No. 62/794,295, for DIGITAL ASSET CUSTODIAL SYSTEM, which was filed on Jan. 18, 2019, and which is incorporated here by reference.

TECHNICAL FIELD

The following disclosure relates generally to secure account access, and in particular, to methods, apparatus and systems related to secure network access of a user account through a user interface on a client device.

BACKGROUND

Individuals maintain user accounts with different organizations, such as a bank account, an investment account, or a credit card account, among others. Individuals access such user accounts through a web browser or a dedicated client application running on their devices, such as a desktop, laptop, tablet or a smartphone. To access a user account, an individual usually has to provide a username and password, or other credentials that identify the individual.

SUMMARY

The present disclosure describes methods, apparatus and systems for secure network access of a user account through a user interface client program, such as a web browser, on a client device. An individual who has a user account with an organization, e.g., a cryptoasset custodian that manages digital assets such as cryptocurrencies, a bank or an investment firm, uses a client device, such as laptop or a desktop, in conjunction with a mobile device, such as a smartphone or a tablet, to securely access the user account through a web browser without relying on username, password, or other similar long-term credentials.

In some implementations, the mobile device includes a trusted hardware component to provide authentication/validation functionality for secure transactions corresponding to the user account and secure storage of cryptographic keys used by the individual user for the secure transactions. The individual user registers, with the organization, one or more cryptographic keys as being associated with the user account to facilitate secure online transactions without using username and password, or other similar credentials. In some implementations, the individual also registers, with the organization, the mobile device as being associated with the user account. In some implementations, the individual installs, on the mobile device, an application associated with the organization, and uses that application to communicate with the organization.

Subsequent to registering the cryptographic keys with the organization, when the individual initiates a secure transaction for the user account through a web browser presented on the client device display, the client device contacts a back-end server of the organization and requests a security challenge token from the server. In response to the request, the server generates a random security challenge token and sends the token to the client device, which presents the token on the device display, e.g., shown on the web browser window. In some implementations, the security challenge token is a one-time use token. In some implementations, the security challenge token is a matrix barcode, such as a Quick Response Code (QR Code), or an alphanumeric text string.

The individual uses the application on the mobile device to obtain a representation of the security challenge token displayed by the client device. In some implementations, the representation of the security challenge token is obtained by scanning, by the application, the security challenge token shown on the device display using a camera coupled to the mobile device. The application prompts the individual to confirm whether to cryptographically sign the security challenge token. In response to the prompt, the individual provides biometric information to confirm proceeding with signing the security challenge token.

The mobile device verifies the identity of the individual by authenticating the biometric information and that the individual is authorized to proceed with signing the security challenge. Upon successful verification, the mobile device controls the trusted hardware component to sign the security challenge token using a cryptographic key stored in the trusted hardware component. The mobile device sends the security challenge token along with the signature to the server.

Upon receiving the security challenge token and the signature from the mobile device, the server accesses, from the one or more keys that the individual has registered with the organization, a verification key that corresponds to the signing key, and verifies the signature using the verification key. If the verification is successful, then the server authorizes a secure session for the individual, and sends information about the session to the client device. The client device accordingly provides a user interface on the device display to the user, e.g., through the web browser, to allow the individual to perform the secure transaction for the user account.

In a general aspect, a secure transaction with a network resource includes receiving, at a computing device corresponding to the network resource from a first client device, a request for a security token to authenticate a transaction session corresponding to a user account administered by the network resource, wherein the first client device is associated with the user account. In response to the request, the computing device generates a particular security token, and sends the particular security token to the first client device, wherein the first client device communicates the particular security token to a second client device that is distinct from the computing device or the first client device. The computing device receives, from the second client device, a modified security token, which includes the particular security token and a signature on the particular security token that is signed using a first key stored in a trusted hardware component coupled to the second client device, wherein a second key corresponding to the first key is registered with the network resource. The computing device verifies the modified security token using the second key. Upon successfully verifying the modified security token, the computing device enables the transaction session corresponding to the user account.

Particular implementations may include one or more of the following features. The request may include information identifying the first client device, and wherein generating the particular security token may comprise: examining the information identifying the first client device; determining, based on the examining, whether the first client device is authorized to host the transaction session; and generating the particular security token conditioned on determining that the first client device is authorized to host the transaction session. The information identifying the first client device may include one or more of a network address of the first client device, a location of the first client device, or a time of the request. Determining whether the first client device is authorized to host the transaction session may comprise at least one of determining that an association of the network address with the user account is registered with the network resource, determining that the transaction session is permitted at the location of the first client device, or determining that the transaction session is permitted at the time of the request. Conditioned on determining that the first client device is not authorized to host the transaction session, the computing device may generate an error condition.

The first key may be an asymmetric private key and the second key may be a public key corresponding to the private key. Registering the second key with the computing device may comprise receiving, at a time prior to receiving the request from the first client device, a registration message from the second client device, the registration message including the public key, information associating the second client device with the user account, and information authenticating the second client device. Upon successfully verifying the information authenticating the second client device, the second client device may be recorded as associated with the user account, and the public key may be stored as associated with the second client device and the user account.

The first key may be a symmetric key and the second key may be a function of the symmetric key. Registering the second key with the computing device may comprise receiving, at a time prior to receiving the request from the first client device, a registration message from the second client device, the registration message including information associating the second client device with the user account, and information authenticating the second client device. Upon successfully verifying the information authenticating the second client device, the second client device may be recorded as associated with the user account, and a secure key exchange communication may be initiated with the second client device. The second key may be received from the second client device as part of the secure key exchange communication. The second key may be stored as associated with the second client device and the user account. The second key may be same as the first key.

Sending the particular security token to the first client device may comprise sending, along with the particular security token, information indicating a validity time period for the particular security token. Verifying the modified security token may comprise determining whether the validity time period has expired. Conditioned on determining that the validity time period has not expired, the signature may be verified using the second key.

Sending the particular security token to the first client device may comprise sending, along with the particular security token, information uniquely identifying the particular security token. Verifying the modified security token may comprise determining, using the information uniquely identifying the particular security token, whether the modified security token has been used before. Conditioned on determining that the modified security token has not been used before, the signature may be verified using the second key.

Enabling the transaction session corresponding to the user account may comprise sending information to the first client device to provide a portal for the transaction session, and enabling transactions corresponding to the user account through the portal provided on the first client device.

The second client device may obtain, using an application executed by the second client device, a representation of the security token presented on the first client device. Upon obtaining the representation of the security token, the second client device may request confirmation to sign the security token. In response to the request, the second client device may receive an input confirming proceeding with signing the security token. The second client device may authenticate the input. Upon successfully authenticating the input, the second client device may control a trusted hardware component coupled to the second client device to generate the modified security token by signing the security token using the first key stored in the trusted hardware component, and send, to the computing device, the modified security token.

The network resource may be a cryptoasset custodial system, and the user account may be a custodial account administered by the cryptoasset custodial system.

In another general aspect, a secure transaction with a network resource includes receiving, at a first client device, an input to access an application associated with the network resource. In response to the input, the first client device executes the application and obtains, using the application, a representation of a security token presented on a second client device, the security token associated with the secure transaction, wherein the security token is generated by a computing device corresponding to the network resource. Upon obtaining the representation of the security token, the first client device requests, using the application, confirmation for proceeding with the secure transaction. In response to the request, the first client device receives an input confirming proceeding with the secure transaction. The first client device authenticates the input. Upon authenticating the input, the first client device controls a trusted hardware component coupled to the first client device to generate a modified security token, wherein the modified security token includes the security token and a signature on the security token that is signed using a first key stored in the trusted hardware component, and wherein a second key corresponding to the first key is registered with the network resource. The first client device sends the modified security token to the computing device.

Particular implementations may include one or more of the following features. Obtaining the representation of the security token may comprise obtaining information identifying the second client device along with the representation of the security token. The information identifying the second client device may include one or more of a network address of the second client device, or a location of the second client device. Requesting confirmation for proceeding with the secure transaction may comprise displaying, using the application, one or more of the network address of the second client device, or the location of the second client device, and requesting confirmation to process the secure transaction that is associated with the second client device.

Receiving the input confirming proceeding with the secure transaction may comprise receiving a biometric input from a user of the first client device. Authenticating the input may comprise determining that information provided by the biometric input matches biometric information corresponding to an authorized user of the first client device. Receiving the biometric input may comprise receiving one or more of a fingerprint scan of the user, a face scan of the user, or a retinal scan of the user. The biometric information corresponding to the authorized user of the first client device may be stored in the trusted hardware component. Authenticating the input may comprise authenticating the input using the trusted hardware component.

The first key may be an asymmetric private key and the second key may be a public key corresponding to the private key. The second key being registered with the network resource may comprise sending, to the computing device at a time prior to obtaining the representation of the security token, a registration message including the public key, information associating the first client device with a user account administered by the network resource, and information authenticating the first client device. The computing device may be configured to, upon successfully verifying the information authenticating the first client device, record the first client device as associated with the user account, and store the public key as associated with the first client device and the user account.

Obtaining the representation of the security token may comprise obtaining, along with the representation of the security token, information indicating a validity time period for the security token. Requesting the confirmation for proceeding with the secure transaction may comprise determining whether the validity time period has expired. The confirmation may be requested conditioned on determining that the validity time period has not expired.

Obtaining the representation of the security token may comprise obtaining, along with the representation of the security token, information uniquely identifying the security token. Requesting the confirmation for proceeding with the secure transaction may comprise determining, using the information uniquely identifying the security token, whether the security token has been used before. The confirmation may be requested conditioned on determining that the security token has not been used before.

The network resource may be a cryptoasset custodial system, and the application may be a custodial application corresponding to the cryptoasset custodial system that is configured to provide access to user accounts administered by the cryptoasset custodial system.

Implementations of the above techniques include methods, apparatus, systems and computer program products. One such system comprises one or more processors and storage media storing instructions that are operable to cause the one or more processors to perform the above-described actions. One such computer program product is suitably embodied in a non-transitory machine-readable medium that stores instructions executable by one or more processors. The instructions are configured to cause the one or more processors to perform the above-described actions.

Using the novel features described above and in the following sections of this specification, an individual can securely login to a website through a client device using an accompanying application on a mobile device, without relying on reusable credentials, such as username and password. Since such reusable credentials can be phished, avoiding use of such credentials prevent phishing attacks, improving security for performing online transactions. The disclosed techniques provide a superior user experience to log in to a website, since scanning the security challenge token using the mobile device application and using biometrics to authenticate the transaction, are easier than requiring the individual to remember, and type in, a username and a password.

The techniques facilitate a unified authentication flow using a common cryptographic key material stored in the trusted hardware component of the mobile device to log in to the mobile device application and authenticate the secure session. This also ensures a secure association between the session and the application on the mobile device. The use of biometric information, e.g., fingerprint or face scan, to access the cryptographic key material stored in the trusted hardware component, also strengthens security compared to relying on username and password, or other similar credentials that can be more easily compromised.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 8 is a high-level block diagram illustrating an example of a hardware architecture of a processing system that can be used to implement some or all of the CCS or a client device.

Like reference numbers in the figures indicate like elements.

DETAILED DESCRIPTION

Figure 1:
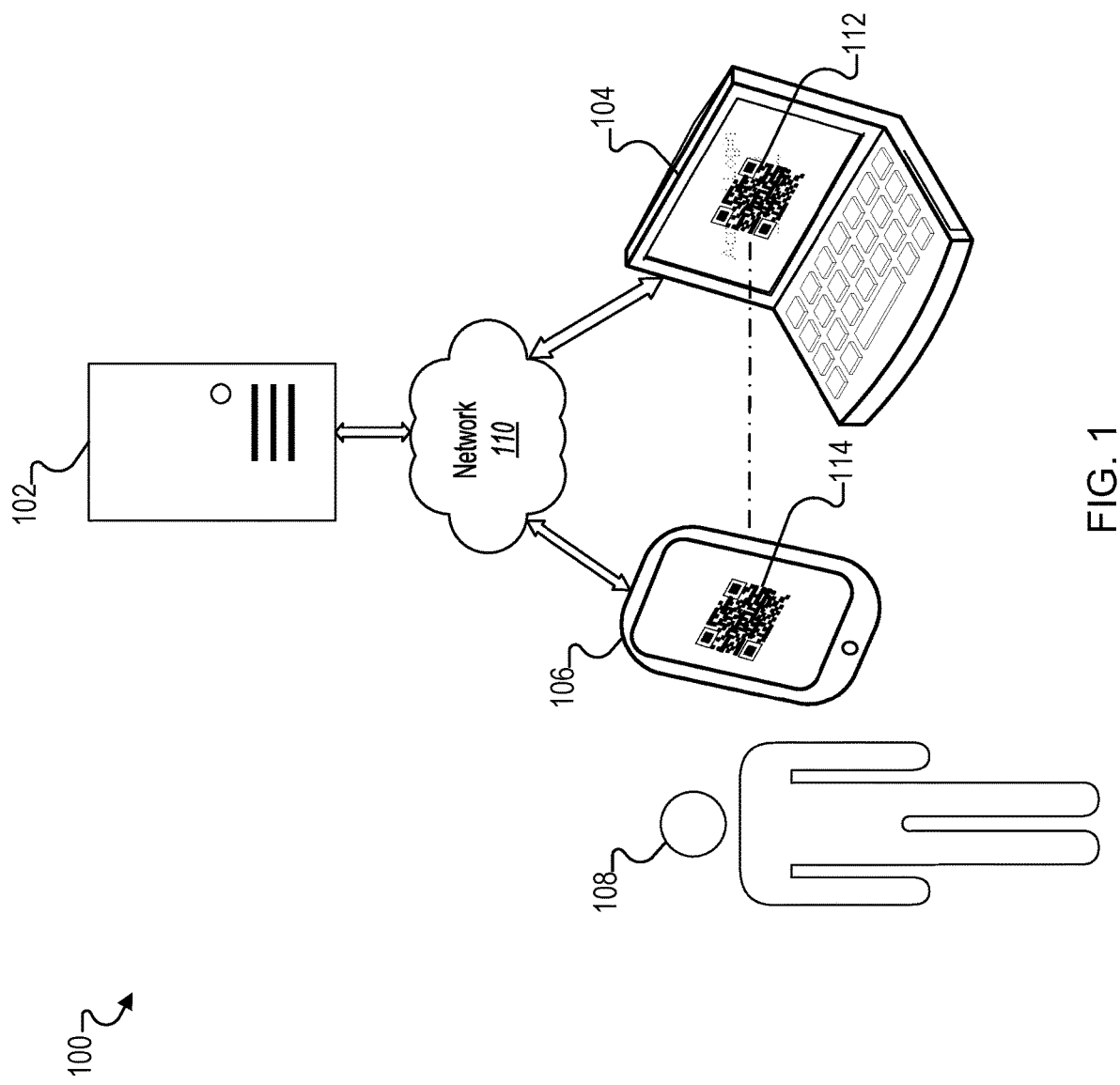
FIG. 1 is a high-level system diagram illustrating an example of a system for secure network access of a user account.

FIG. 1 is a high-level system diagram illustrating an example of a system 100 for secure network access of a user account. The system 100 includes a server 102 that is connected to a client device 104 and a mobile device 106 through a network 110. The client device 104 and the mobile device 106 are associated with an individual user 108.

In some implementations, the server 102 is a data processing and storage device associated with an organization, e.g., a bank, an investment firm, a social media company, or a service provider for various services, such as a utility, an online communication service provider, a telecommunications service provider, among others. In some implementations, the organization is a cryptoasset custodian, and the system 100 corresponds to a cryptoasset custodial system (CCS), which is described in greater detail with respect to the system 700 below. Although only one server 102 is shown, in some implementations the system 100 includes multiple servers that are associated with the organization. These servers perform various functions for the organization, including providing functionality of a backend login system that processes requests to access user accounts. In the following sections, the functionality of the backend login system is represented as being provided by the server 102 without loss of generality.

The individual user 108 has a user account with the organization represented by the server 102. In some implementations, the individual user 108 is a customer having a customer account with the organization. For example, the individual user 108 can have a custodial account with a CCS, to conduct financial transactions using cryptocurrencies. Alternatively, the individual user 108 can have a bank account with a bank or an investment account with an investment firm, to conduct monetary or stock transactions. Alternatively, the individual user 108 can have user account with an electricity or water utility, to view and pay utility bills. As another example, the individual user 108 can have user account with an email services provider, or a social media services provider. In some implementations, the individual user 108 is an employee or a contractor of the organization who has an employee user account with the organization.

The individual user 108 accesses the user account maintained with the organization by logging in to the user account remotely, e.g., through a web browser running on the client device 104. In some implementations, the client device 104 is a desktop or a laptop computer. In other implementations, the client device 104 is a tablet computer, a smartphone, a media player, an electronic book reader, or some other suitable device.

To facilitate secure web access of the user account, the individual user 108 associates the mobile device 106 with the user account in the records of the organization. Performing operations on the mobile device 106 is restricted to authorized users, e.g., the individual user 108. In some implementations, the mobile device is a smartphone. In other implementations, the mobile device is tablet computer, a media player, an electronic book reader, a laptop computer, or some other suitable device.

The mobile device 106 includes a trusted hardware component for performing secure transactions, such as a security chip. The mobile device 106 can control the trusted hardware component to generate and store cryptographic keys for the secure transactions. The mobile device 106 controls access to the functions of the trusted hardware component by requiring an authorized user, e.g., the individual user 108, to verify her identity by inputting information to the mobile device that uniquely identifies the user. In some implementations, the information that uniquely identifies the user is biometric information, such as a fingerprint, a face scan, or a retinal scan of the user. An architecture of the mobile device 106 with the trusted hardware component is described in greater detail below with respect to the mobile device 300 (shown in FIG. 3).

To associate the mobile device 106 with the user account in the records of the organization, the individual user 108 installs and runs an application (e.g., an "app") corresponding to the organization on the mobile device 106. In some implementations, the application is created and made available by the organization. In some implementations, upon executing the application on the mobile device 106, the individual user 108 enters information corresponding to the user account to associate the application and the mobile device with the user account. In some implementations, the user 108 also enables use of biometric authentication for subsequent uses of the application. In some implementations, following biometric authentication, the user 108 authorizes the application to control the trusted hardware component to generate one or more cryptographic keys for secure transactions for the user account. Using the application running on the mobile device 106, the user 108 communicates with the organization's servers and registers the one or more of the cryptographic keys as being associated with the user account. In some implementations, the user also registers the mobile device 106 as being associated with the user account.

In some implementations, the cryptographic keys for secure transactions for the user account include asymmetric keys, e.g., a public and private key pair such as RSA keys, ECDSA keys, or EdDSA keys, generated by the trusted hardware component. The private key is securely stored in the trusted hardware component in the mobile device. The public key is registered with the organization's servers as being associated with the user account.

Alternatives to asymmetric keys can be used. For example, in some cases, the cryptographic keys for secure transactions for the user account include a symmetric key, e.g., based on the Advanced Encryption Standard (AES) or the Blowfish standard, among others, generated by the trusted hardware component. The symmetric key is securely stored in the trusted hardware component in the mobile device. A function of the symmetric key, e.g., a hash value resulting from hashing the symmetric key, is registered with the organization's servers as being associated with the user account.

Communications between the server 102, the client device 104 and the mobile device 106 occur through the network 110. The network 110 can be a local area network (LAN), such as a Wi-Fi or Ethernet network in a building. The network 110 can be a wide area network (WAN), such as a cellular network, a fiber optic or cable network, or a combination of these. In some implementations, the network 110 is a combination of a LAN and a WAN. In some implementations, the network 110 includes the Internet.

The following paragraphs provide a high-level overview of the disclosed techniques for secure website access to the user account using the system 100. A more detailed description of the communication between the various entities for the secure access is provided with respect to the timing diagram 400 and the processes 500 and 600 (shown in FIGS. 4, 5 and 6, respectively).

To login to the user account using the client device 104, the user 108 accesses a user interface of the organization on the client device 104. In some implementations, the user interface is a website that the user accesses on a web browser running on the client device 104. In other implementations, the user interface is provided by a standalone client program executed on the client device 104.

Upon the user access, the client device sends a request to the backend servers of the organization, e.g., the server 102, to enable a secure session for the user 108 to access the user account. The server 102 responds with a security challenge token, which is shown on a display of the client device 104 as security challenge token 112. In some implementations, the security challenge token 112 is a QR code. In some implementations, the security challenge token 112 is an alphanumeric string. In some implementations, the security challenge token 112 is in any suitable format that can be graphically reproduced on a device display and a representation of which can be captured using an optical input device, e.g., an image.

When the client device 104 displays the security challenge token 112, the user 108 obtains a representation of the token using the mobile device 106. For example, the user can control the application running on the mobile device 106 to capture an image of the displayed token using an optical input device coupled to the mobile device, e.g., a smartphone camera. In some implementations, the optical input device is used as a scanner to scan the token 112 shown on the client device display. A representation 114 of the token is subsequently shown on a display of the mobile device 106.

Figure 2A:
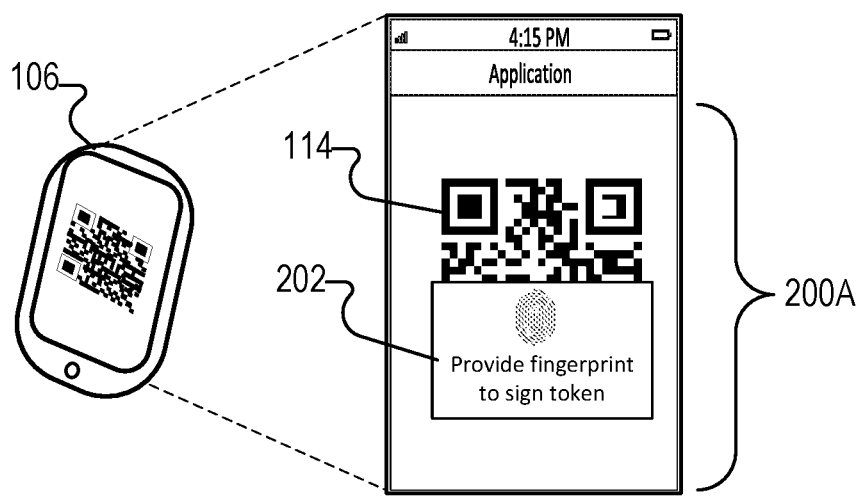
FIGS. 2A and 2B illustrate examples of application graphical user interfaces (GUIs) showing device prompts for biometric inputs to authorize signing a security challenge token.
Figure 2B:
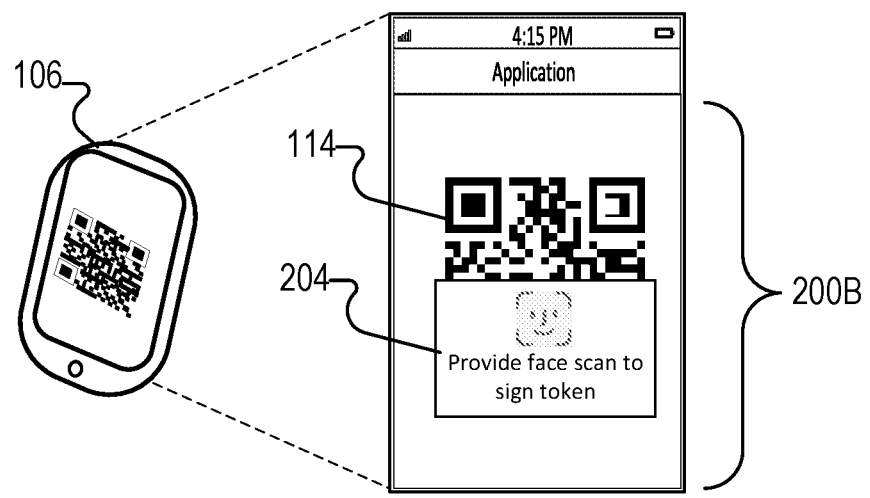

In some implementations, upon obtaining the representation of the token and presenting the representation on the mobile device display, the application prompts the user 108 to authorize authenticating the security challenge token by signing the token using the cryptographic key stored in the trusted hardware component. The user inputs biometric information, e.g., a fingerprint, a face scan, or a retinal scan, in response to the prompt, to authorize the signing the token. FIGS. 2A and 2B illustrate examples of application graphical user interfaces (GUIs) 200A and 200B, respectively, showing device prompts for biometric inputs to authorize signing a security challenge token.

FIG. 2A shows an exploded view of the display of the mobile device 106, illustrating GUI 200A of the application presented on the display. As shown, the application GUI 200A displays the representation 114 of the security challenge token, and also presents a prompt 202, requesting that the user satisfy a biometric challenge to authorize signing the token. In some implementations, the mobile device 106 is an iPhone™ and the application is an iOS™ application running on the iPhone. In such cases, the biometric challenge requires providing the user's fingerprint, e.g., TouchID™. In some implementations, the mobile device 106 runs the Android™ operating system with a Trusted Execution Environment that uses Android's Keystore functionality. In such implementations, the mobile device 106 uses Android's KeyChain application programming interface (API) to require fingerprint authentication as the biometric challenge, e.g., when using signing keys stored in the Keystore.

FIG. 2B shows another exploded view of the display of the mobile device 106, illustrating GUI 200B of the application presented on the display. As shown, the application GUI 200B displays the representation 114 of the security challenge token, and also presents a prompt 204, requesting that the user satisfy another biometric challenge, e.g., by providing a face scan, to authorize signing the token. As noted above, in some implementations, the mobile device 106 is an iPhone™. In such cases, providing the user's face scan corresponds to the biometric FaceID™.

Other implementations are also possible. For example, the biometric challenge can require a scan of the user's retina, which is provided in response to a prompt requesting a retinal scan.

In some implementations, additional individualized information is used with the biometric challenge. The individualized information can include, e.g., the user's voice sample, which is provided in response to a prompt requesting the voice sample. Additionally or alternatively, the individualized information can include physical gestures, heartbeat, or passphrase, which are verified in addition to verification of the supplied signature.

Returning to FIG. 1, when the user provides a biometric input (e.g., fingerprint, face scan or retinal scan) in response to the prompt, the application verifies that the user is an authorized user by matching the input to biometric information of authorized users stored in the mobile device 106, e.g., stored in the trusted hardware component.

If the user is successfully verified, the application controls the trusted hardware component to sign the representation 114 of the security challenge token using a cryptographic key stored in the trusted hardware component and that is associated with the user account. The application then controls the mobile device 106 to send the representation of the security challenge token with the signature to the server 102 through the network 110.

Upon receiving the representation of the security challenge token with the signature from the mobile device, the server 102 accesses the cryptographic key that is registered with the organization as associated with the user account, as described above, and that corresponds to the key used by the trusted hardware component to sign the token. Using the accessed cryptographic key, the server 102 verifies the signature.

If the signature is verified as valid, e.g., signed by an authorized user of the user account, then the server 102 enables the secure session for the user account. For example, in some implementations, the server creates a secure web session and sends the session information, e.g., session identifier (ID), to the client device 104. The client device 104 then provides a user interface, e.g., a user account dashboard in the web browser window on the device display, for the user 108 to perform secure transactions for the user account during the secure session.

Figure 3:
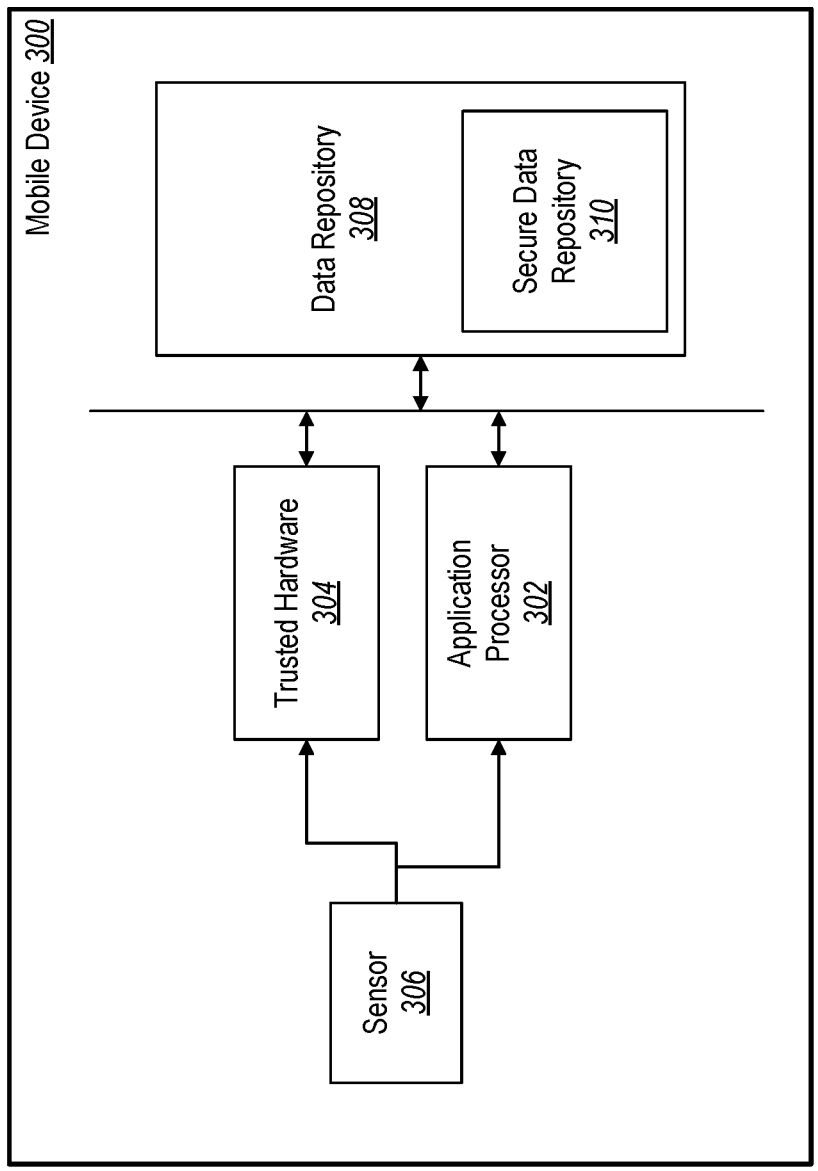
FIG. 3 is a high-level block diagram illustrating an example of a hardware architecture of a mobile device with a trusted hardware component.

FIG. 3 is a high-level block diagram illustrating an example of a hardware architecture of a mobile device 300 with a trusted hardware component. In some implementations, the mobile device 300 is similar to the mobile device 106. As shown, the mobile device 300 includes an application processor 302, a trusted hardware component 304, a sensor 306 and a data repository 308, which further includes a secure data repository 310.

The application processor 302 is a general-purpose processor, which is responsible for several processing tasks of the mobile device 300. In some implementations, the application processor 302 includes multiple processors, or multiple cores.

The trusted hardware component 304 performs secure tasks, such as data encryption, e.g., encrypting data associated with an authorized user's biometric information, such as a fingerprint or a face scan; authorization, e.g., verifying the user input, such as a fingerprint or a face scan, provided in response to a biometric challenge; and signature generation, e.g., signing a security challenge token with a cryptographic key. In some implementations, the trusted hardware component 304 is a processor, such as a secure enclave processor. In some implementations, the trusted hardware component 304 includes multiple processors, or multiple cores. In some implementations, the trusted hardware component 304 is similar to the trusted hardware component described with respect to the mobile device 106.

The sensor 306 represents one or more sensors included in the mobile device 300 that obtains external data for processing by the application processor 302, or the trusted hardware component 304, or both. For example, the sensor 306 can be an optical input device, such as a mobile device camera, that captures the representation 114 of the security challenge token, or a face scan of the user, or both. As another example, the sensor 306 can be a fingerprint sensor that captures a fingerprint of the user.

The application processor 302 or the trusted hardware component 304, or both, are connected to a data storage repository 308, which can include any suitable storage mediums (e.g., magnetic memory or non-volatile flash memory). In some implementations, the data repository 308 includes a secure data repository 310, which stores encrypted data that is processed by the trusted hardware component 304, e.g., data associated with an authorized user's biometric information. Considering the example of fingerprint patterns (e.g., maps based on a scanned fingerprint pattern), the secure data repository 310 can store files for multiple authorized users, files for multiple fingers of each user, multiple files for each finger, or any suitable combination of these. The secure data repository 310 can be separate from the main data repository 308, or it can be a part of the main data repository 308.

As an example of use of the trusted hardware component 304 to perform security operations, in some implementations, the sensor 306 scans a texture of an object, e.g., a fingerprint. This texture is translated into an associated pattern map by sensor 306, application processor 302, or trusted hardware component 304. The trusted hardware component 304 then retrieves encrypted templates (e.g., based on patterns associated with authorized users) from the secure data repository, and match the translated pattern map with the encrypted templates. If there is a match, the trusted hardware component performs the security operation. For example, the trusted hardware component retrieves the cryptographic key associated with the user account from the secure data repository 310, and signs the representation 114 of the security challenge token using the key. The trusted hardware component then provides a result, e.g., the signature, to the application.

Figure 4:
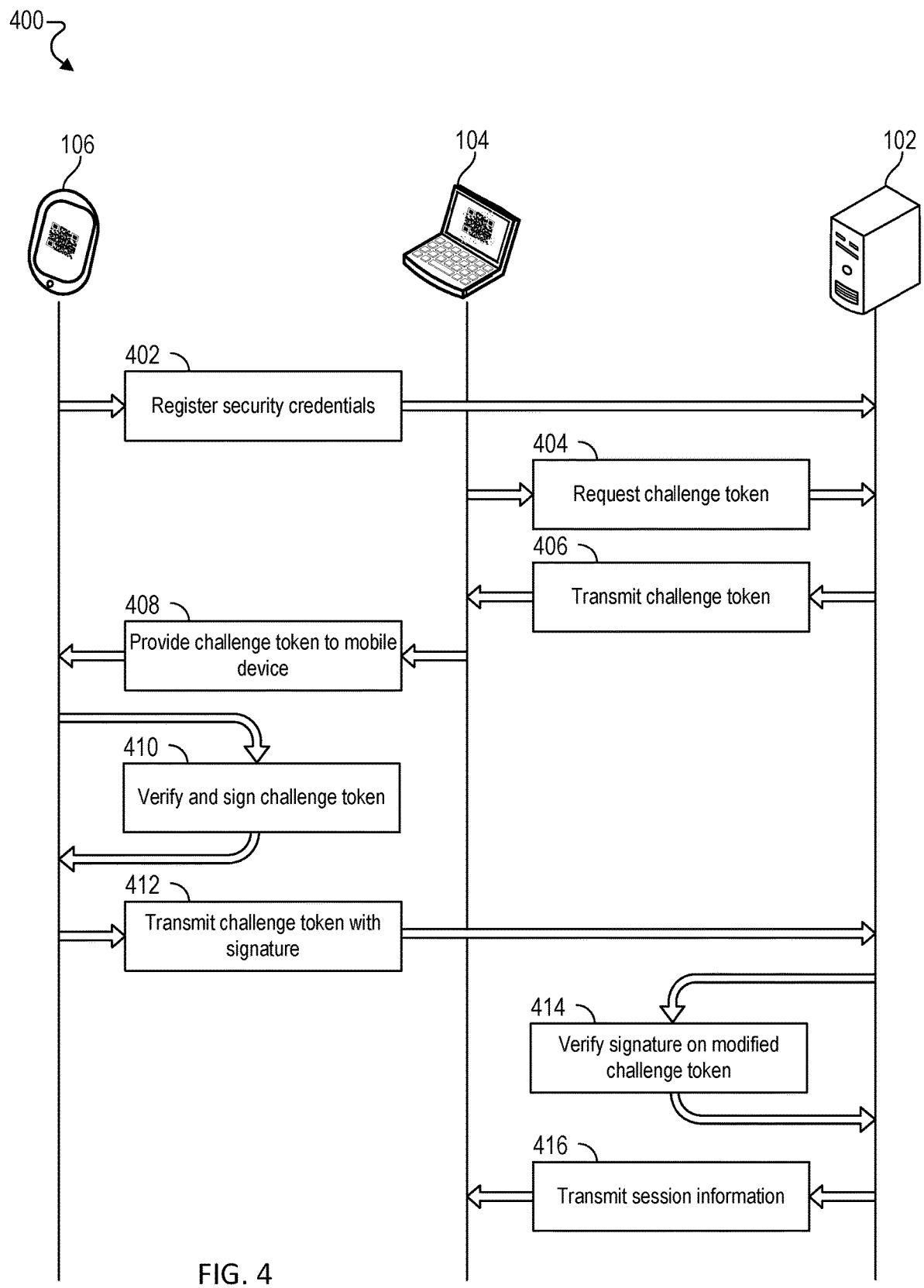
FIG. 4 is a timing diagram illustrating an example of message exchanges for secure network access of a user account.

FIG. 4 is a timing diagram 400 illustrating an example of message exchanges for secure network access of a user account. In some implementations, the message exchanges and related operations shown by the timing diagram 400 is performed among the server 102, the client device 104 and the mobile device 106 to establish a secure session for the user 108 for access to the user account registered with the organization, as described with respect to the system 100. Accordingly, the following sections describe the message exchanges and related operations with respect to the server 102, the client device 104 and the mobile device 106. However, the message exchanges and related operations also may be performed by other devices.

The messages described below can be transmitted using any suitable protocol, e.g., HTTPS. Additionally, these example messages should not be considered limiting, as any suitable mechanism for performing the functions described could be used, and the messages could be sent or received in any suitable sequence.

In the message flow shown by the timing diagram 400, initially, the mobile device 106 transmits a message 402 to organization's servers, e.g., the server 102, to register security credentials. For example, the individual user 108 pre-registers, with the organization, a cryptographic key for the user account. Using the application running on the mobile device 106, the user 108 controls the trusted hardware component of the mobile device 106 to generate a signing key (e.g., a private key) and a corresponding verification key (e.g., a public key corresponding to the private key), and securely reports the verification key to the organization's servers, such as server 102. The signing key is securely stored in the mobile device, e.g., in the secure data repository 310.

Subsequently, the user 108 initiates a secure session on the client device 104 to access her user account at the organization. In some implementations, the user 104 launches a user interface client, e.g., a web browser, on the client device 104 and accesses a user account login website for the organization. The user interface client sends a message 404 to the backend login system for the organization, e.g., the server 102, requesting a security challenge token. In some implementations, the user interface client includes additional information in the message 404, such as the location of the client device 104, the network address (e.g., internet protocol (IP) address) of the device, and other user information.

The backend login system for the organization, e.g., the server 102, creates a random security challenge token, e.g., security challenge token 112, and sends the security challenge token to the client device 104 in a response message 406.

The client device 104 communicates the security challenge token to the mobile device 106. As described previously, in some implementations, the client device 104 displays the security challenge token on the client device display, enabling the application running on the mobile device 106 to obtain a representation of the token, e.g., the representation 114, using an optical input device, such as a camera. This indirect communication between the client device 104 and the mobile device 106 is represented in the timing diagram as message 408. However, in some other implementations, the client device 104 sends a message 408 to the mobile device 106 that includes the security challenge token.

The application running on the mobile device 106 displays the representation of the security challenge token on the mobile device display and prompts the user 108 to authorize signing the challenge token, which is represented by message 410. In some implementations, the application also obtains information about the user interface client running on the client device 104, such as web browser identity and location of the client device, and presents the information on the mobile device display as part of prompting the user for authorization. When the user 108 authorizes the signing by providing biometric information, the application controls the trusted hardware component of the mobile device to verify the user using the biometric information. If the user is successfully verified, the application controls the trusted hardware component to sign the representation of the security challenge token using the signing key generated for the user account.

The mobile device 106 sends a message 412 to the backend login system, e.g., the server 102, with the security challenge token and the signature. For example, after the trusted hardware component signs the representation of the security challenge token, the application controls the mobile device 106 to transmit the representation of the security challenge token along with the signature to the server 102 through the network 110.

The backend login system, e.g., the server 102, obtains the signed security challenge token from the message 412 and cryptographically verifies the signature using the verification key that the user had pre-registered with the organization, which is indicated by 414 in the timing diagram.

If the signature is successfully verified, then the server 102 establishes a secure session for the user account. The server transmits the session information, e.g., session ID, to the client device 104 in a message 416. In some implementations, the session information also includes a specified session duration. The client device 104 then provides a user interface for the secure session, e.g., a user account dashboard in a web browser window on the device display, for the user 108 to perform secure transactions for the user account during the secure session.

Figure 5:
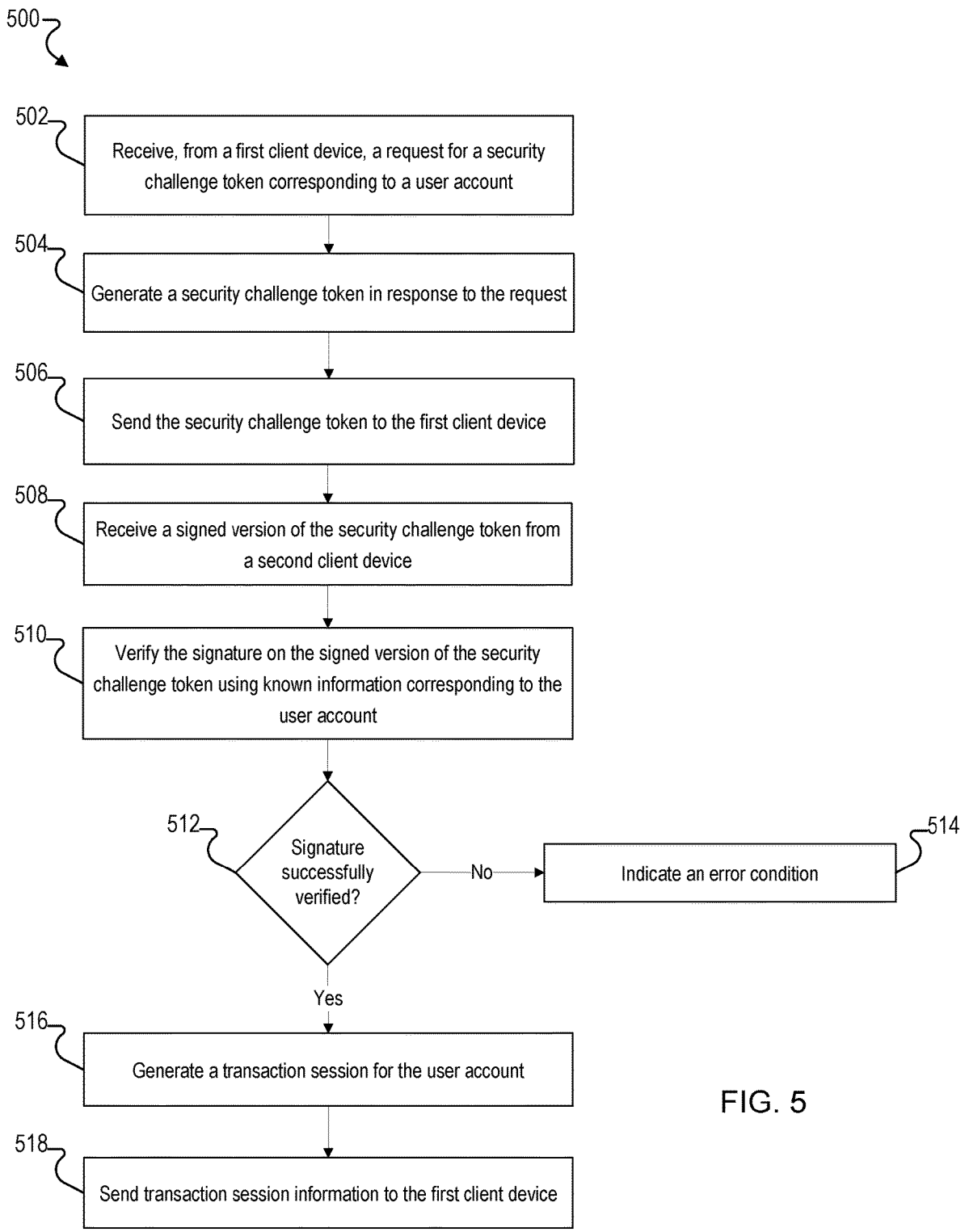
FIG. 5 illustrates an example of a process to enable a secure session by a server.

FIG. 5 illustrates an example of a process 500 to enable a secure session by a server. In some implementations, the process 500 is performed by the server 102 upon receiving a request for a security challenge token from the client device 104, when the user 108 initiates a secure session for the user account using the client device 104. Accordingly, the following sections describe the process 500 with respect to the server 102. However, the process 500 also may be performed by other devices.

The process 500 starts when the server receives, from a first client device, a request for a security challenge token corresponding to a user account (502). For example, the server 102 receives a request from the client device 104 to generate a security challenge token for the user account that the individual user 108 has with the organization. The client device 104 sends the request to the server 102 when the user 108 attempts to access the user account through a user interface on the client device 104, e.g., an account login website of the organization shown on a window of a web browser running on the client device 104, or a standalone user interface client program of the organization running on the client device. In some implementations, the request from the client device 104 includes additional information about the transaction, such as the location or IP address of the client device 104, and identifying information about the user 108.

The server generates a security challenge token in response to the request (504). For example, upon receiving the request from the client device 104, the server 102 generates a random security challenge token. In some implementations, the server 102 generates a distinct security challenge token for every request that it receives, and a previously generated security challenge token is not re-used.

In some implementations, before generating the security challenge token, the server 102 checks the location or IP address, or both, of the client device 104 and verifies that the client device 104 at the specified location or with the specified network address is allowed to host a secure session (e.g., the location or IP address of the client device 108 does not correspond to a barred location, such as a blacklisted foreign country). In some implementations, the server 102 also verifies the identity of the user 108, e.g., to determine that the user is authorized to conduct transactions for the particular user account. In some implementations, when the server generates the security challenge token, the server assigns a short-lived validity window, e.g., in the order of several minutes, during which the security challenge token will be valid.

The server sends the security challenge token to the first client device (506). For example, after generating the security challenge token in response to the request, the server 102 sends a message to the client device 104 with the security challenge token. In some implementations, the message also includes information about the validity window for the token.

The server receives a signed version of the security challenge token from a second client device (508). For example, at a time subsequent to sending the security challenge token to the client device 104, the server 102 receives, from the mobile device 106, a message that includes a copy of the security challenge token, along with a signature on the token. As discussed previously and also with respect to the process 600 below, the application running on the mobile device 106 obtains a representation of the security challenge token from the client device 104, controls the trusted hardware component of the mobile device to sign the security challenge token with a cryptographic key, and sends the representation of the security challenge token with the signature to the server 102.

The server verifies the signature on the signed version of the security challenge token using known information corresponding to the user account (510). For example, in some implementations, the user 108 generates, using the trusted hardware component of the mobile device 106, a cryptographic key, e.g., a private key, for signing transactions corresponding to the user account. The trusted hardware component also generates a companion cryptographic key, e.g., a public key corresponding to the private key, for verifying the signatures on the transactions. The user pre-registers the verification key with the server 102. Accordingly, upon receiving, from the mobile device 106, the signed version of the security challenge token, the server 102 determines the corresponding user account and retrieves, from local storage, the verification key that is registered for the user account. The server then cryptographically verifies the signature using the verification key.

The server confirms whether the signature is successfully verified (512). For example, the server 102 determines whether the result of the cryptographic operation using the verification key matches the signature on the security challenge token. In some implementations, before or in addition to verifying the signature, the server confirms that the validity window for the security challenge token has not expired, and proceeds with the signature verification if the security challenge token is still valid. Additionally or alternatively, in some implementations, before or in addition to verifying the signature, the server confirms that the security challenge token it received from the mobile device 106 is the token that was generated for the current transaction, and not a token previously generated, e.g., to prevent replay attacks.

The server indicates an error condition if the signature is not successfully verified (514). For example, in some implementations, the server 102 determines that the result of the cryptographic operation using the verification key does not match the signature on the security challenge token. Additionally or alternatively, the server can determine that the validity window has expired at the time it received the signed version of the security challenge token from the mobile device 106. Additionally or alternatively, the server can determine that the security challenge token it received from the mobile device is an old token that is being reused, e.g., in a replay attack. In these cases, the server 102 sends a notification to the client device 104, rejecting the user attempt to establish a secure session.

On the other hand, if the signature is not successfully verified, the server generates a transaction session for the user account (516). For example, in some implementations, the server 102 determines that the result of the cryptographic operation using the verification key matches the signature on the security challenge token. Accordingly, the user 108 is verified as being authorized to access the requested user account. The server 102 then creates a session for the user 108. In some implementations, the server authorizes the session for a certain time period, which is longer than the validity window of the security challenge token. For example, the server can authorize the session for 30 minutes, or 1 or 2 hours.

Upon creating the session, the server sends the transaction session information to the first client device (518). For example, the server 102 sends a message to the client device 104, indicating that the session request from the user 108 is accepted, and that a secure session has been established for the user 108 to access the user account. In some implementations, the message includes a session ID for the session. Additionally or alternatively, in some implementations, the message indicates a duration for which the session is authorized. Upon receiving the message from the server, the client device 104 then provides a user account dashboard for the user 108 to access the user account and perform transactions.

Figure 6:
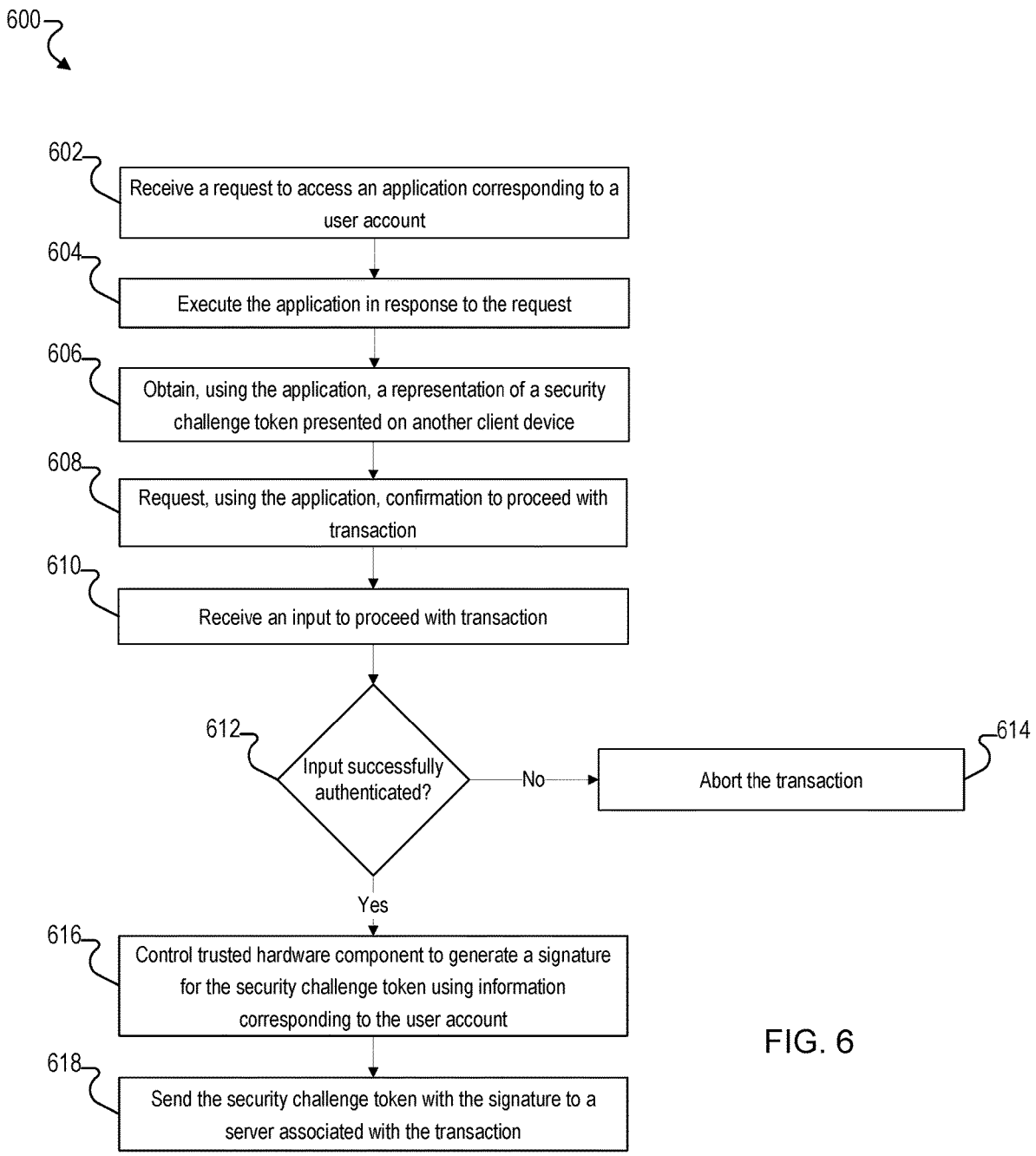
FIG. 6 illustrates an example of a process to enable a secure session by a mobile device.

FIG. 6 illustrates an example of a process 600 to enable a secure session by a mobile device. In some implementations, the process 600 is performed by the mobile device 106 when the individual user 108 controls the application running on the mobile device to sign a security challenge token shown on the display of the client device 104. Accordingly, the following sections describe the process 600 with respect to the mobile device 106. However, the process 600 also may be performed by other devices.

The process 600 starts when the mobile device receives a request to access an application corresponding to a user account (602). For example, the mobile device 106 receives an input from the user 108 to run the application corresponding to the organization that is installed in the mobile device, where the user 108 has a user account that is administered by the organization.

The mobile device executes the application in response to the request (604). For example, in response to the input from the user 108, the mobile device 106 launches the application and presents a user interface of the application on the display of the device.

The mobile device obtains, using the application, a representation of a security challenge token presented on another client device (606). For example, as described previously, the client device 104 displays a security challenge token 112 sent by the server 102, when the user 108 uses the mobile device 104 to access her user account. When the security challenge token is displayed on the device 104 display, the user 108 controls the mobile device 106, and the application running on the mobile device, to capture an image of the displayed security challenge token 112. In some implementations, the user 108 controls the application running on the mobile device to scan the security challenge token 112 from the device 104 display using a camera of the mobile device 106.

The mobile device requests, using the application, a confirmation to proceed with the transaction (608). For example, upon obtaining an image of the security challenge token displayed on the client device 104 display, the mobile device 106 presents the obtained representation 114 on the GUI of the application shown on the mobile device display, such as GUI 200A or GUI 200B. Along with the representation 114, a prompt is presented on the GUI, such as prompt 202 or 204, requesting a biometric input from the user to sign the security challenge token to proceed with the transaction.

The mobile device receives an input to proceed with the transaction (610). For example, in response to the prompt 202 or 204 presented on the application GUI, the user 108 provides a biometric input to the mobile device, such as a fingerprint, a face scan, or a retinal scan.

The mobile device determines whether the input is successfully authenticated (612). For example, upon receiving the biometric input from the user 108, the application controls the trusted hardware component of the mobile device 106 to verify, using information about authorized users recorded by the trusted hardware component (e.g., in the secure data repository 310), that the biometric input corresponds to an authorized user.

If the input is not successfully authenticated, then the mobile device aborts the transaction (614). For example, if trusted hardware component determines that the biometric input provided by the user does not match the data of any authorized user recorded by the trusted hardware component, the trusted hardware component returns a result to the application indicating failure. The application consequently determines that the present user of the mobile device 106 is not an authorized user, and accordingly aborts the transaction. In some implementations, the application displays an error message, indicating that the user cannot be authenticated.

On the other hand, if the input is successfully authenticated, then the mobile device controls the trusted hardware component to generate a signature for the security challenge token using information corresponding to the user account (616). For example, in some implementations, the trusted hardware component of the mobile device 106 determines that the biometric input provided by the user matches the data of an authorized user recorded by the trusted hardware component, and returns a result to the application indicating authentication success. The application consequently determines that the present user of the mobile device 106 is an authorized user. Upon this determination, the application controls the trusted hardware component to sign the representation of the security challenge token obtained by the mobile device, using the signing key (e.g., private key) corresponding to the user account that is available to the trusted hardware component.

The mobile device sends the security challenge token with the signature to a server associated with the transaction (618). For example, upon signing the security challenge token using the signing key corresponding to the user account, the trusted hardware component sends the signature to the application. The application then controls the mobile device 106 to send a message with a modified version of the security challenge token to the server 102. In some implementations, the modified version of the security challenge token includes the representation of the security challenge token obtained by the mobile device and the signature. In some implementations, the modified version of the security challenge token includes the signature without the representation of the security challenge token. Upon receiving the message from the mobile device, the server 102 verifies the signature and determines whether to establish the secure session for the user 108, as described previously, e.g., with respect to the process 500.

Figure 7:
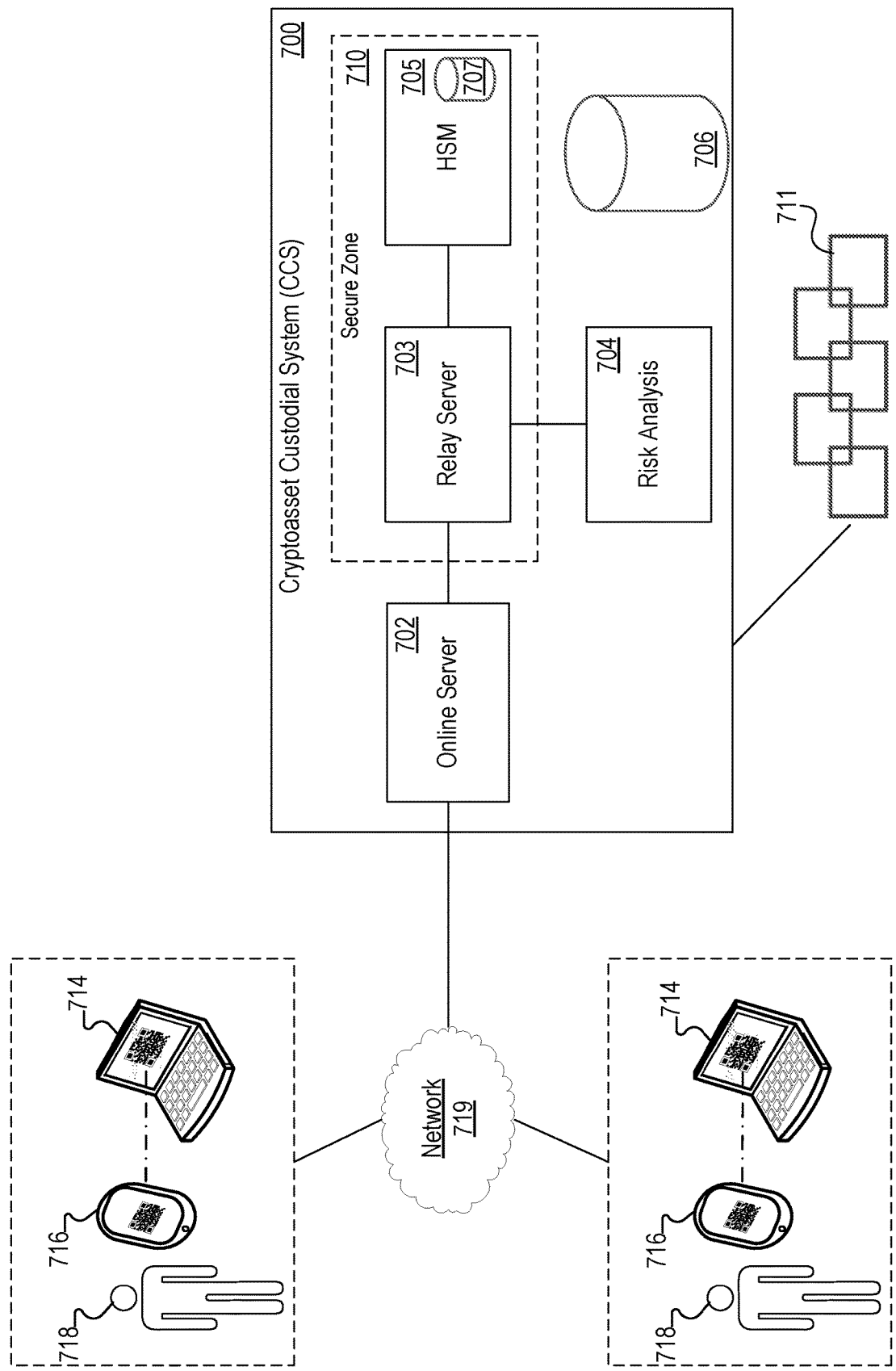
FIG. 7 is a high-level block diagram of a cryptoasset custodial system (CCS) that enables secure network access of a user account.

FIG. 7 is a high-level block diagram of a cryptoasset custodial system (CCS) 700 that enables secure network access of a user account. In some implementations, the system 700 is similar to the organization described with respect to the system 100. As shown, the CCS 700 includes an online server 702, a relay server 703, a risk analysis stage 704, a hardware security module (HSM) 705, and a data storage facility 706. The data storage facility 706 may include one or more databases, which can be or include relational databases or any other type of mechanism for storing data in an organized way, where the data may be structured data and/or unstructured data. The HSM 705 also includes its own internal secure storage facility 707. There can be multiple instances of each of the above-mentioned components in the CCS 700, even though only one of each is shown to simplify description.

One or more users 718 communicate with the CCS 700 via a public network 719, such as the internet. In some implementations, the network 719 is similar to the network 110. Each user 718 uses one or more devices 714 and 716 to communicate with the CCS 700. The user devices 714 or 716, or both, can be any one of, for example, a smartphone, a tablet computer, a laptop computer, a desktop computer, or the like. In some implementations, the user device 714 is similar to the client device 104, and the user device 716 is similar to the mobile device 106. In some implementations, each user device 716 includes a trusted hardware component, such as an iOS-based secure enclave, which is used to store the corresponding user's private key and to generate digital signatures of that user.

In some implementations, the HSM 705 physically resides in a physically secured datacenter with no direct access to any outside network. Messages between the HSM 705 and the online server 702 are routed on a half-duplex (outbound request-responses only) connection to the relay server 703 in the secure zone 710. The relay server 703 disconnects itself from the secure network while communicating with the online server 702, and disconnects itself from all external networks while communicating with the HSM 705, such that no interactive sessions with those devices can be established from the outside. This provides virtual "air gap" security to critical infrastructure.

In some implementations, the online server 702 is similar to the server 102 and provides a login system to process user requests for secure online access to user accounts administered by the CCS 700. In some implementations, a user 718 establishes a secure session with the CCS 700 through a user interface client, e.g., a web browser, running on the user's device 714. The user 718 authenticates the secure session using the respective user devices 714 and 716, using techniques that rely on verifying a signature on a security challenge token from the online server 702, as described with respect to techniques disclosed in this specification, e.g., with respect to timing diagram 400 and processes 500 and 600.

In some implementations, the CCS 700 has access to a blockchain network 711 corresponding to digital assets, e.g., cryptocurrencies, of which the CCS 700 has custody. Access to the blockchain network 711 can be via the public network 719.

FIG. 8 is a high-level block diagram illustrating an example of a hardware architecture of a device 800 that can be used to implement components of a CCS, such as the CCS 700, or a client device, such as client device 714. The device 800 includes one or more processors, including a CPU 810, one or more memories 811 (at least a portion of which may be used as working memory, e.g., random access memory (RAM)), one or more data communication device(s) 812, one or more input/output (I/O) devices 813, and one or more mass storage devices 814, all coupled to each other through an interconnect 815. The interconnect 815 can be, or include, one or more conductive traces, buses, point-to-point connections, controllers, adapters and/or other conventional connection devices. Each processor 810 controls part of the operation of the device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 814 can be, or include, one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 can be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the device 800, each I/O device 813 can be, or include, a device such as a display (which may include a transparent AR display surface), audio speaker, keyboard, mouse or other pointing device, microphone, camera, etc. In some implementations, e.g., in which the device 800 represents a server computer, such as the server 702, such I/O devices are not present.

In case of a user device, a communication device 812 can be, or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be, or include, for example, any of the aforementioned types of communication interfaces, a wired Ethernet adapter, cable modem, DSL modem, or the like, or a combination of such interfaces.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for a secure transaction with a network resource, the method comprising:
   receiving, at a computing device corresponding to the network resource from a first client device, a request for a security token to authenticate a transaction session corresponding to a user account administered by the network resource, wherein the first client device is associated with the user account;
   in response to the request:
      generating, by the computing device, a particular security token, and
      sending, to the first client device, the particular security token, wherein the first client device communicates the particular security token to a second client device;
   receiving, at the computing device from the second client device, a modified security token,
   wherein the modified security token includes the particular security token and a signature on the particular security token that is signed using a first key stored in a trusted hardware component coupled to the second client device, and
   wherein a second key corresponding to the first key is registered with the network resource by:
      receiving, prior to receiving the request from the first client device, a registration message from the second client device, the registration message including the second key, information associating the second client device with the user account, and information authenticating the second client device; and
      upon successfully verifying the information authenticating the second client device:
         recording the second client device as associated with the user account; and
         storing the second key as associated with the second client device and the user account;
   verifying, by the computing device, the modified security token using the second key, wherein the first key is an asymmetric private key and the second key is a public key corresponding to the private key; and
   upon successfully verifying the modified security token, enabling, by the computing device, the transaction session corresponding to the user account.

2. The method of claim 1, wherein the request includes information identifying the first client device, and wherein generating the particular security token comprises:
   examining the information identifying the first client device;
   determining, based on the examining, whether the first client device is authorized to host the transaction session; and
   generating the particular security token conditioned on determining that the first client device is authorized to host the transaction session.

3. The method of claim 2, wherein the information identifying the first client device includes one or more of a network address of the first client device, a location of the first client device, or a time of the request, and wherein determining whether the first client device is authorized to host the transaction session comprises at least one of:
   determining that an association of the network address with the user account is registered with the network resource,
   determining that the transaction session is permitted at the location of the first client device, or
   determining that the transaction session is permitted at the time of the request.

4. The method of claim 2, further comprising:
   conditioned on determining that the first client device is not authorized to host the transaction session, generating an error condition.

5. The method of claim 1, wherein registering the second key further comprises, upon successfully verifying the information authenticating the second client device:
   initiating a secure key exchange communication with the second client device; and
   receiving, from the second client device, the second key as part of the secure key exchange communication.

6. The method of claim 1, wherein sending the particular security token to the first client device comprises sending, along with the particular security token, information indicating a validity time period for the particular security token, and wherein verifying the modified security token comprises:
   determining whether the validity time period has expired; and
   conditioned on determining that the validity time period has not expired, verifying the signature using the second key.

7. The method of claim 1, wherein sending the particular security token to the first client device comprises sending, along with the particular security token, information uniquely identifying the particular security token, and wherein verifying the modified security token comprises:
   determining, using the information uniquely identifying the particular security token, whether the modified security token has been used before; and
   conditioned on determining that the modified security token has not been used before, verifying the signature using the second key.

8. The method of claim 1, wherein enabling the transaction session corresponding to the user account comprises:
   sending information to the first client device to provide a portal for the transaction session; and enabling transactions corresponding to the user account through the portal provided on the first client device.

9. The method of claim 1, further comprising:
obtaining, by the second client device using an application executed by the second client device, a representation of the security token presented on the first client device;
upon obtaining the representation of the security token, requesting, by the second client device, confirmation to sign the security token;
in response to the request, receiving an input confirming proceeding with signing the security token;
authenticating the input;
upon successfully authenticating the input, controlling a trusted hardware component coupled to the second client device to generate the modified security token by signing the security token using the first key stored in the trusted hardware component; and
sending, by the second client device to the computing device, the modified security token.

10. The method of claim 1, wherein the network resource is a cryptoasset custodial system, and the user account is a custodial account administered by the cryptoasset custodial system.

11. A method performed by a first client device for a secure transaction with a network resource, the method comprising:
receiving, at the first client device, an input to access an application associated with the network resource;
in response to the input, executing the application;
obtaining, using the application, a representation of a security token presented on a second client device, the security token associated with the secure transaction, wherein the security token is generated by a computing device corresponding to the network resource;
upon obtaining the representation of the security token, requesting, using the application, confirmation for proceeding with the secure transaction;
in response to the request, receiving an input confirming proceeding with the secure transaction;
authenticating the input;
upon authenticating the input, controlling a trusted hardware component coupled to the first client device to generate a modified security token, wherein the modified security token includes the security token and a signature on the security token that is signed using a first key stored in the trusted hardware component, and
wherein a second key corresponding to the first key is registered with the network resource by:
sending, to the computing device, prior to obtaining the representation of the security token, a registration message including the second key, information associating the first client device with a user account administered by the network resource, and information authenticating the first client device,
wherein upon successfully verifying the information authenticating the first client device, the computing device is configured to:
record the first client device as associated with the user account; and
store the second key as associated with the first client device and the user account; and
sending, by the first client device to the computing device, the modified security token, wherein the first key is an asymmetric private key and the second key is a public key corresponding to the private key.

12. The method of claim 11, wherein obtaining the representation of the security token comprises obtaining information identifying the second client device along with the representation of the security token, and wherein the information identifying the second client device includes one or more of a network address of the second client device, or a location of the second client device.

13. The method of claim 12, wherein requesting confirmation for proceeding with the secure transaction comprises:
displaying, using the application, one or more of the network address of the second client device, or the location of the second client device; and
requesting confirmation to process the secure transaction that is associated with the second client device.

14. The method of claim 11, wherein receiving the input confirming proceeding with the secure transaction comprises receiving a biometric input from a user of the first client device, and wherein authenticating the input comprises:
determining that information provided by the biometric input matches biometric information corresponding to an authorized user of the first client device.

15. The method of claim 14, wherein receiving the biometric input comprises receiving one or more of a fingerprint scan of the user, a face scan of the user, or a retinal scan of the user.

16. The method of claim 14, wherein the biometric information corresponding to the authorized user of the first client device is stored in the trusted hardware component, and wherein authenticating the input comprises authenticating the input using the trusted hardware component.

17. The method of claim 11, wherein obtaining the representation of the security token comprises obtaining, along with the representation of the security token, information indicating a validity time period for the security token, and wherein requesting the confirmation for proceeding with the secure transaction comprises:
determining whether the validity time period has expired; and
conditioned on determining that the validity time period has not expired, requesting the confirmation.

18. The method of claim 11, wherein obtaining the representation of the security token comprises obtaining, along with the representation of the security token, information uniquely identifying the security token, and wherein requesting the confirmation for proceeding with the secure transaction comprises:
determining, using the information uniquely identifying the security token, whether the security token has been used before; and
conditioned on determining that the security token has not been used before, requesting the confirmation.

19. The method of claim 11, wherein the network resource is a cryptoasset custodial system, and the application is a custodial application corresponding to the cryptoasset custodial system that is configured to provide access to user accounts administered by the cryptoasset custodial system.

20. A system comprising:
one or more processors; and
storage media storing instructions that are operable to cause the one or more processors to perform operations comprising:
receiving, at a computing device corresponding to a network resource from a first client device, a request for a security token to authenticate a transaction session corresponding to a user account administered by the network resource, wherein the first client device is associated with the user account;

in response to the request:
  generating, by the computing device, a particular security token, and
  sending, to the first client device, the particular security token, wherein the first client device communicates the particular security token to a second client device;

receiving, at the computing device from the second client device, a modified security token,
wherein the modified security token includes the particular security token and a signature on the particular security token that is signed using a first key stored in a trusted hardware component coupled to the second client device, and
wherein a second key corresponding to the first key is registered with the network resource by:
  receiving, prior to receiving the request from the first client device, a registration message from the second client device, the registration message including the second key, information associating the second client device with the user account, and information authenticating the second client device; and
  upon successfully verifying the information authenticating the second client device:
    recording the second client device as associated with the user account; and
    storing the second key as associated with the second client device and the user account;
verifying, by the computing device, the modified security token using the second key, wherein the first key is an asymmetric private key and the second key is a public key corresponding to the private key; and
upon successfully verifying the modified security token, enabling, by the computing device, the transaction session corresponding to the user account.

21. The system of claim 20, wherein the request includes information identifying the first client device, and wherein generating the particular security token comprises:
  examining the information identifying the first client device;
  determining, based on the examining, whether the first client device is authorized to host the transaction session; and
  generating the particular security token conditioned on determining that the first client device is authorized to host the transaction session.

22. The system of claim 21, wherein the information identifying the first client device includes one or more of a network address of the first client device, a location of the first client device, or a time of the request, and wherein determining whether the first client device is authorized to host the transaction session comprises at least one of:
  determining that an association of the network address with the user account is registered with the network resource,
  determining that the transaction session is permitted at the location of the first client device, or
  determining that the transaction session is permitted at the time of the request.

23. The system of claim 21, wherein the operations further comprise:
  conditioned on determining that the first client device is not authorized to host the transaction session, generating an error condition.

24. The system of claim 20, wherein registering the second key further comprises, upon successfully verifying the information authenticating the second client device:
  initiating a secure key exchange communication with the second client device; and
  receiving, from the second client device, the second key as part of the secure key exchange communication.

25. The system of claim 20, wherein sending the particular security token to the first client device comprises sending, along with the particular security token, information indicating a validity time period for the particular security token, and wherein verifying the modified security token comprises:
  determining whether the validity time period has expired; and
  conditioned on determining that the validity time period has not expired, verifying the signature using the second key.

26. The system of claim 20, wherein sending the particular security token to the first client device comprises sending, along with the particular security token, information uniquely identifying the particular security token, and wherein verifying the modified security token comprises:
  determining, using the information uniquely identifying the particular security token, whether the modified security token has been used before; and
  conditioned on determining that the modified security token has not been used before, verifying the signature using the second key.

27. The system of claim 20, wherein enabling the transaction session corresponding to the user account comprises:
  sending information to the first client device to provide a portal for the transaction session; and
  enabling transactions corresponding to the user account through the portal provided on the first client device.

28. The system of claim 20, wherein the operations further comprise:
  obtaining, by the second client device using an application executed by the second client device, a representation of the security token presented on the first client device;
  upon obtaining the representation of the security token, requesting, by the second client device, confirmation to sign the security token;
  in response to the request, receiving an input confirming proceeding with signing the security token;
  authenticating the input;
  upon successfully authenticating the input, controlling a trusted hardware component coupled to the second client device to generate the modified security token by signing the security token using the first key stored in the trusted hardware component; and
  sending, by the second client device to the computing device, the modified security token.

29. The system of claim 20, wherein the network resource is a cryptoasset custodial system, and the user account is a custodial account administered by the cryptoasset custodial system.

30. A system for enabling a secure transaction with a network resource, the system comprising:
  one or more processors; and
  storage media storing instructions that are operable to cause the one or more processors to perform operations comprising:
    receiving, at a first client device, an input to access an application associated with a network resource;
    in response to the input, executing the application;

obtaining, using the application, a representation of a security token presented on a second client device, the security token associated with the secure transaction, wherein the security token is generated by a computing device corresponding to the network resource;

upon obtaining the representation of the security token, requesting, using the application, confirmation for proceeding with the secure transaction;

in response to the request, receiving an input confirming proceeding with the secure transaction;

authenticating the input;

upon authenticating the input, controlling a trusted hardware component coupled to the first client device to generate a modified security token, wherein the modified security token includes the security token and a signature on the security token that is signed using a first key stored in the trusted hardware component, and wherein a second key corresponding to the first key is registered with the network resource by:

sending, to the computing device, prior to obtaining the representation of the security token, a registration message including the second key, information associating the first client device with a user account administered by the network resource, and information authenticating the first client device, wherein upon successfully verifying the information authenticating the first client device, the computing device is configured to:

record the first client device as associated with the user account; and store the second key as associated with the first client device and the user account; and sending, by the first client device to the computing device, the modified security token, wherein the first key is an asymmetric private key and the second key is a public key corresponding to the private key.

31. The system of claim 30, wherein obtaining the representation of the security token comprises obtaining information identifying the second client device along with the representation of the security token, and wherein the information identifying the second client device includes one or more of a network address of the second client device, or a location of the second client device.

32. The system of claim 31, wherein requesting confirmation for proceeding with the secure transaction comprises:

displaying, using the application, one or more of the network address of the second client device, or the location of the second client device; and requesting confirmation to process the secure transaction that is associated with the second client device.

33. The system of claim 30, wherein receiving the input confirming proceeding with the secure transaction comprises receiving a biometric input from a user of the first client device, and wherein authenticating the input comprises:

determining that information provided by the biometric input matches biometric information corresponding to an authorized user of the first client device.

34. The system of claim 33, wherein receiving the biometric input comprises receiving one or more of a fingerprint scan of the user, a face scan of the user, or a retinal scan of the user.

35. The system of claim 33, wherein the biometric information corresponding to the authorized user of the first client device is stored in the trusted hardware component, and wherein authenticating the input comprises authenticating the input using the trusted hardware component.

36. The system of claim 30, wherein obtaining the representation of the security token comprises obtaining, along with the representation of the security token, information indicating a validity time period for the security token, and wherein requesting the confirmation for proceeding with the secure transaction comprises:

determining whether the validity time period has expired; and conditioned on determining that the validity time period has not expired, requesting the confirmation.

37. The system of claim 30, wherein obtaining the representation of the security token comprises obtaining, along with the representation of the security token, information uniquely identifying the security token, and wherein requesting the confirmation for proceeding with the secure transaction comprises:

determining, using the information uniquely identifying the security token, whether the security token has been used before; and conditioned on determining that the security token has not been used before, requesting the confirmation.

38. The system of claim 30, wherein the network resource is a cryptoasset custodial system, and the application is a custodial application corresponding to the cryptoasset custodial system that is configured to provide access to user accounts administered by the cryptoasset custodial system.

39. A non-transitory storage medium storing instructions that are operable to cause one or more processors to perform operations comprising:

receiving, at a computing device corresponding to a network resource from a first client device, a request for a security token to authenticate a transaction session corresponding to a user account administered by the network resource, wherein the first client device is associated with the user account;

in response to the request:

generating, by the computing device, a particular security token, and sending, to the first client device, the particular security token, wherein the first client device communicates the particular security token to a second client device;

receiving, at the computing device from the second client device, a modified security token, wherein the modified security token includes the particular security token and a signature on the particular security token that is signed using a first key stored in a trusted hardware component coupled to the second client device, and wherein a second key corresponding to the first key is registered with the network resource by:

receiving, prior to receiving the request from the first client device, a registration message from the second client device, the registration message including the second key, information associating the second client device with the user account, and information authenticating the second client device; and upon successfully verifying the information authenticating the second client device:

recording the second client device as associated with the user account; and storing the second key as associated with the second client device and the user account;

verifying, by the computing device, the modified security token using the second key, wherein the first key is an asymmetric private key and the second key is a public key corresponding to the private key; and upon successfully verifying the modified security token, enabling, by the computing device, the transaction session corresponding to the user account.

40. The non-transitory storage medium of claim 39, wherein the request includes information identifying the first client device, and wherein generating the particular security token comprises:

examining the information identifying the first client device;

determining, based on the examining, whether the first client device is authorized to host the transaction session; and generating the particular security token conditioned on determining that the first client device is authorized to host the transaction session.

41. The non-transitory storage medium of claim 40, wherein the information identifying the first client device includes one or more of a network address of the first client device, a location of the first client device, or a time of the request, and wherein determining whether the first client device is authorized to host the transaction session comprises at least one of:

determining that an association of the network address with the user account is registered with the network resource, determining that the transaction session is permitted at the location of the first client device, or determining that the transaction session is permitted at the time of the request.

42. The non-transitory storage medium of claim 40, wherein the operations further comprise:

conditioned on determining that the first client device is not authorized to host the transaction session, generating an error condition.

43. The non-transitory storage medium of claim 39, wherein registering the second key further comprises, upon successfully verifying the information authenticating the second client device:

initiating a secure key exchange communication with the second client device; and receiving, from the second client device, the second key as part of the secure key exchange communication.

44. The non-transitory storage medium of claim 39, wherein sending the particular security token to the first client device comprises sending, along with the particular security token, information indicating a validity time period for the particular security token, and wherein verifying the modified security token comprises:

determining whether the validity time period has expired; and conditioned on determining that the validity time period has not expired, verifying the signature using the second key.

45. The non-transitory storage medium of claim 39, wherein sending the particular security token to the first client device comprises sending, along with the particular security token, information uniquely identifying the particular security token, and wherein verifying the modified security token comprises:

determining, using the information uniquely identifying the particular security token, whether the modified security token has been used before; and conditioned on determining that the modified security token has not been used before, verifying the signature using the second key.

46. The non-transitory storage medium of claim 39, wherein enabling the transaction session corresponding to the user account comprises:

sending information to the first client device to provide a portal for the transaction session; and enabling transactions corresponding to the user account through the portal provided on the first client device.

47. The non-transitory storage medium of claim 39, wherein the operations further comprise:

obtaining, by the second client device using an application executed by the second client device, a representation of the security token presented on the first client device;

upon obtaining the representation of the security token, requesting, by the second client device, confirmation to sign the security token;

in response to the request, receiving an input confirming proceeding with signing the security token;

authenticating the input;

upon successfully authenticating the input, controlling a trusted hardware component coupled to the second client device to generate the modified security token by signing the security token using the first key stored in the trusted hardware component; and sending, by the second client device to the computing device, the modified security token.

48. The non-transitory storage medium of claim 39, wherein the network resource is a cryptoasset custodial system, and the user account is a custodial account administered by the cryptoasset custodial system.

49. A non-transitory storage medium storing instructions that are operable to cause one or more processors to perform operations comprising:

receiving, at a first client device, an input to access an application associated with a network resource;

in response to the input, executing the application;

obtaining, using the application, a representation of a security token presented on a second client device, the security token associated with a secure transaction corresponding to the network resource, wherein the security token is generated by a computing device corresponding to the network resource;

upon obtaining the representation of the security token, requesting, using the application, confirmation for proceeding with the secure transaction;

in response to the request, receiving an input confirming proceeding with the secure transaction;

authenticating the input;

upon authenticating the input, controlling a trusted hardware component coupled to the first client device to generate a modified security token, wherein the modified security token includes the security token and a signature on the security token that is signed using a first key stored in the trusted hardware component, and wherein a second key corresponding to the first key is registered with the network resource by:

sending, to the computing device, prior to obtaining the representation of the security token, a registration message including the second key, information associating the first client device with a user account administered by the network resource, and information authenticating the first client device, wherein upon successfully verifying the information authenticating the first client device, the computing device is configured to:

record the first client device as associated with the user account; and store the second key as associated with the first client device and the user account; and sending, by the first client device to the computing device, the modified security token, wherein the first key is an asymmetric private key and the second key is a public key corresponding to the private key.

50. The non-transitory storage medium of claim 49, wherein obtaining the representation of the security token comprises obtaining information identifying the second client device along with the representation of the security token, and wherein the information identifying the second client device includes one or more of a network address of the second client device, or a location of the second client device.

51. The non-transitory storage medium of claim 50, wherein requesting confirmation for proceeding with the secure transaction comprises:
displaying, using the application, one or more of the network address of the second client device, or the location of the second client device; and
requesting confirmation to process the secure transaction that is associated with the second client device.

52. The non-transitory storage medium of claim 49, wherein receiving the input confirming proceeding with the secure transaction comprises receiving a biometric input from a user of the first client device, and wherein authenticating the input comprises:
determining that information provided by the biometric input matches biometric information corresponding to an authorized user of the first client device.

53. The non-transitory storage medium of claim 52, wherein receiving the biometric input comprises receiving one or more of a fingerprint scan of the user, a face scan of the user, or a retinal scan of the user.

54. The non-transitory storage medium of claim 52, wherein the biometric information corresponding to the authorized user of the first client device is stored in the trusted hardware component, and wherein authenticating the input comprises authenticating the input using the trusted hardware component.

55. The non-transitory storage medium of claim 49, wherein obtaining the representation of the security token comprises obtaining, along with the representation of the security token, information indicating a validity time period for the security token, and wherein requesting the confirmation for proceeding with the secure transaction comprises:
determining whether the validity time period has expired; and
conditioned on determining that the validity time period has not expired, requesting the confirmation.

56. The non-transitory storage medium of claim 49, wherein obtaining the representation of the security token comprises obtaining, along with the representation of the security token, information uniquely identifying the security token, and wherein requesting the confirmation for proceeding with the secure transaction comprises:
determining, using the information uniquely identifying the security token, whether the security token has been used before; and
conditioned on determining that the security token has not been used before, requesting the confirmation.

57. The non-transitory storage medium of claim 49, wherein the network resource is a cryptoasset custodial system, and the application is a custodial application corresponding to the cryptoasset custodial system that is configured to provide access to user accounts administered by the cryptoasset custodial system.

* * * * *